J. CROOKES.
Removable Saw-Teeth.
No. 141,427.  Patented August 5, 1873.
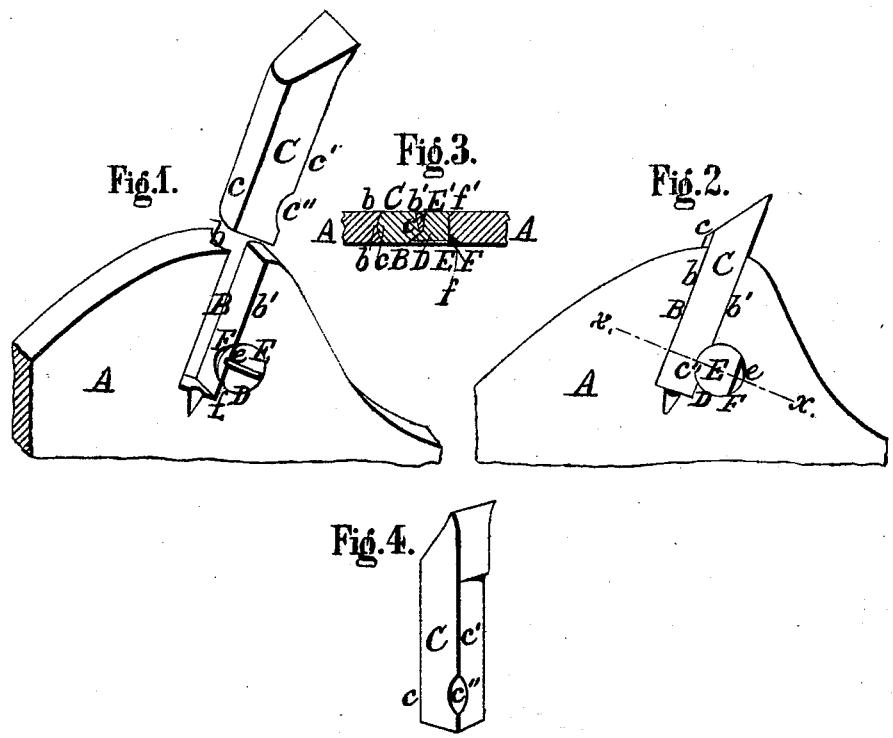
ATTEST:
Jas. L. Ewin
Walter Allen
INVENTOR:
Joseph Crookes
By Knight Bros.
Attys.

UNITED STATES PATENT OFFICE.

JOSEPH CROOKES, OF ST. LOUIS, MISSOURI, ASSIGNOR OF ONE-HALF HIS RIGHT TO JOSEPH W. BRANCH, OF SAME PLACE.

IMPROVEMENT IN REMOVABLE SAW-TEETH.

Specification forming part of Letters Patent No. 141,427, dated August 5, 1873; application filed June 9, 1873.

*To all whom it may concern:*

Be it known that I, JOSEPH CROOKES, of St. Louis, St. Louis county, Missouri, have invented an Improvement in Removable Saw-Teeth, of which the following is a specification:

My improvement relates to the manner of securing the removable teeth in the plate; and consists of the following arrangement: A screw or rivet passes through the saw-plate beside the slot, into which the tooth is inserted, and the screw or rivet projects into the slot and enters suitably-formed cavities in the tooth to hold the tooth in place. The projecting part of the rivet or screw is cut away at one side, leaving at that point a flat spot that is just flush with that side of the slot when the rivet or screw is in position to allow the insertion and removal of the tooth, as shown in Figs. 1 and 2.

In the drawings, Figure 1 is a perspective view with the tooth removed, and the holding rivet in position to admit of its insertion. Fig. 2 is a side view with the tooth inserted, and the holding rivet so turned as to secure it. Fig. 3 is a section at line X X, Fig. 2. Fig. 4 is a perspective view of the tooth as in Fig. 1, showing its beveled front side.

A is a part of the saw-plate having at the edge an inclined slot, B, to receive the tooth C. The rear side $b$ of the slot is grooved or recessed, as shown, so as to prevent transverse movement of the tooth, and the rear edge $c$ of the tooth is suitably formed to fit the groove $b$. In Figs. 1 and 3 the front edge $c'$ of the tooth is shown beveled, and the front side $b'$ is suitably beveled to fit the same, so as to hold the tooth from side movement in one direction, the rivet-head E preventing its side movement in the other direction. D is the rivet whose head E is made to project at the edge into the slot B, but is cut away at one side, as shown at $e$, so that when the spot $e$ is turned to the tooth, as shown in Fig. 1, the tooth may be inserted or drawn out of the slot. The rivet fits and turns in a hole, F, at the edge $b'$ of the slot B, and the said hole may be open on one side to the slot all across the saw-plate A, or may be open to the slot only part way across the plate, as shown in Figs. 1 and 2, but in either case a part of the rivet or screw projects into the slot and into the edge of the tooth at $c''$, when the latter is in working position and holds it firmly in place. The hole F, as shown in Fig. 3, has countersinks $f\ f'$ at the ends, as the rivets shown in these figures must be double-headed to hold them against transverse strain, but where a screw is used in place of a rivet but one head E and countersink $f$ is required, as the screw-thread takes the transverse strain, and the head E' and countersink $f'$ are thus rendered unnecessary.

I claim as my invention—

The combination of the tooth C beveled at C', the slot B beveled at $b'$, and the rivet D having a flat portion or spot, $e$, all substantially as and for the purpose set forth.

JOSEPH CROOKES.

Witnesses:
SAML. KNIGHT,
ANTHONY SCHULTE.